United States Patent
Salmela et al.

(10) Patent No.: US 9,654,966 B2
(45) Date of Patent: May 16, 2017

(54) METHODS AND NODES FOR MAPPING SUBSCRIPTION TO SERVICE USER IDENTITY

(71) Applicant: Telefonaktiebolaget L M Ericsson (publ), Stockholm (SE)

(72) Inventors: Patrik Salmela, Espoo (FI); Vesa Lehtovirta, Espoo (FI); Mohit Sethi, Espoo (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 17 days.

(21) Appl. No.: 14/650,004

(22) PCT Filed: Aug. 15, 2014

(86) PCT No.: PCT/SE2014/050939
§ 371 (c)(1),
(2) Date: Jun. 5, 2015

(87) PCT Pub. No.: WO2016/024893
PCT Pub. Date: Feb. 18, 2016

(65) Prior Publication Data
US 2016/0286378 A1    Sep. 29, 2016

(51) Int. Cl.
*H04W 8/18* (2009.01)
*H04L 29/06* (2006.01)
(Continued)

(52) U.S. Cl.
CPC .......... *H04W 8/18* (2013.01); *H04L 9/3234* (2013.01); *H04L 29/06* (2013.01);
(Continued)

(58) Field of Classification Search
CPC ..................................................... H04W 8/18
(Continued)

(56) References Cited

U.S. PATENT DOCUMENTS

| 2007/0050623 A1* | 3/2007 | Huang | H04L 9/3273 713/168 |
| 2008/0016230 A1* | 1/2008 | Holtmanns | H04L 63/08 709/229 |

OTHER PUBLICATIONS

3GPP, "3rd Generation Partnership Project; Technical Specification Group Services and System Aspects; Generic Authentication Architecture (GAA); Generic Bootstrapping Architecture (GBA) (Release 12)", 3GPP TS 33.220 V12.3.0, Jun. 2014, 1-92.

* cited by examiner

*Primary Examiner* — Jacob Lipman
(74) *Attorney, Agent, or Firm* — Murphy, Bilak & Homiller, PLLC

(57) ABSTRACT

The disclosure relates to methods and nodes for mapping a subscription in a network (10) to a service user identity, wherein a communication device (12) accesses the network (10) using the subscription, and wherein the service user identity is used for accessing a service provided by the first network node (16). The method (30) comprises receiving (31), from the communication device (12) a request for a service, the request comprising an authenticated service user identity, providing (32), in response to the request, the communication device (12) access to the service, receiving (33), from the communication device (12), a message comprising a token identifying a mapping of the service user identity to the subscription, and verifying (34) that a service user identity obtained from the token corresponds to the service user identity used when providing access to the communication device (12).

37 Claims, 9 Drawing Sheets

(51) Int. Cl.
  *H04W 12/06* (2009.01)
  *H04L 29/08* (2006.01)
  *H04L 9/32* (2006.01)
  *H04W 4/20* (2009.01)
  *H04W 12/04* (2009.01)
  *H04W 84/04* (2009.01)
(52) U.S. Cl.
  CPC .......... *H04L 63/0428* (2013.01); *H04L 63/06* (2013.01); *H04L 63/08* (2013.01); *H04L 63/10* (2013.01); *H04L 67/02* (2013.01); *H04W 12/06* (2013.01); *H04L 2209/80* (2013.01); *H04W 4/206* (2013.01); *H04W 12/04* (2013.01); *H04W 84/042* (2013.01)
(58) Field of Classification Search
  USPC ........................................................... 726/7
  See application file for complete search history.

METHODS AND NODES FOR MAPPING SUBSCRIPTION TO SERVICE USER IDENTITY

TECHNICAL FIELD

The technology disclosed herein relates generally to the field of authentication in a communications system, and in particular to methods and nodes for mapping a subscription in a network to a service user identity.

BACKGROUND

Generic Bootstrapping Architecture (GBA) is a technology, standardized at the $3^{rd}$ Generation Partnership Project (3GPP), that provides authentication and application security based on 3GPP subscription credentials. Instead of having separate authentication credentials for each service a user intends to use, the user can authenticate himself using the 3GPP subscription credentials to all services. This authentication is possible if the user has a valid identity on a Home Location Register (HLR) or on a Home Subscriber Server (HSS), i.e. if the user has 3GPP subscription credentials with an operator of a wireless network.

The GBA thus makes it possible for users to authenticate themselves to services using the 3GPP subscription credentials. In GBA, a service is denoted Network Application Function (NAF). Details of the GBA authentication can be found in the GBA specification 3GPP TS 330.220, and the authentication function provided by GBA is briefly described with reference to FIG. 1.

In FIG. 1, a user having some kind of device 1 wants to access a service, for instance social network services such as Facebook, LinkedIn, Twitter, Myspace etc. A Bootstrapping Server Function (BSF) 2 of the operator network (denoted 3GPP network in the FIG. 1) provides a user identity that the user has within the service, e.g. user@socialnetwork.com, to the NAF 4, whereby the user can be authenticated in the service. The BSF 2 gets User Security Settings (USS) from a Home Location Register (HLR) or from a Home Subscriber Server (HSS) 3 as part of GBA User Security Settings (GUSS). This mechanism assumes that the service user identity, e.g. user@ socialnetwork.com or more generally user ID@NAF, has been mapped to the 3GPP subscription in the USS beforehand, i.e. that the service user identity is preconfigured in the USS, as indicated at reference numeral 5.

In FIG. 2 the above is next described a bit more in detail. The device 1 with 3GPP credentials (the device being denoted user equipment, UE, in FIG. 2) tries to access a GBA enabled service, i.e. NAF 4, using a user name userID@NAF and with an application protocol such as for instance Hypertext Transfer Protocol (HTTP), arrow 100. The NAF 4 will reply with a HTTP 401 message, arrow 101, requesting the device 1 to authenticate itself. The device 1 will next run the bootstrapping towards the BSF 2. By means of the bootstrapping, indicated at reference numeral 102, the device 1 and the BSF 2 mutually authenticate each other. In addition, both parties generate master key Ks, and the BSF 2 provides the device 1 with an identifier denoted Bootstrapping Transaction Identifier, B-TID, for the authentication run towards the NAF. Next, indicated at box 103, the device 1 generates a NAF specific key, denoted KsNAF, based on the master key Ks. The device 1 calculates a response using the KsNAF, indicated at box 104, and replies (arrow 105) to the 401 message received from the NAF 4, using the NAF specific key KsNAF as the password and the bootstrapping identifier B-TID as the username.

It is noted that there are several types of NAF specific keys, depending on what variant of GBA that is used. So called GBA_ME, which is a Mobile Equipment based GBA, produces a key denoted Ks_NAF, while so called GBA_U, which is GBA with Universal Integrated Circuit Card (UICC)-based enhancements, produces keys denoted Ks_int_NAF and Ks_ext_NAF. For the sake of simplicity the term KsNAF is used throughout the description, and intended to encompass any of the mentioned NAF specific keys.

The NAF 4, which has a trust relationship with the BSF 2, queries (arrow 106) the BSF 2 for the NAF specific key KsNAF by using the B-TID. The BSF 2 generates the (box 107) NAF specific key KsNAF and provides it to the NAF 4 (arrow 108). The NAF 4 can now authenticate the device 1 using the NAF specific key KsNAF. In particular, at box 109, the NAF 4 verifies the response from the device 1 using the KsNAF and the user is authenticated as userID@NAF (box 110). The NAF 4 may also send an HTTP 200 message to the device 1 (arrow in).

The reply (arrow 108) from the BSF 2 to the NAF 4 also comprises the user identity, e.g. International mobile Subscriber Identity (IMSI), IMPI, Mobile Subscriber Integrated Services for Digital Network Number (MSISDN) or some other information stored in the HSS/HLR 3, in particular the GUSS thereof, for the subscription/service/NAF. This user identity is to be used for the user in the service, i.e. the user identity provides a mapping to the account at the service requiring authentication.

However, it has not been defined how to map the 3GPP subscription to a valid user account in the service, instead is has been left as a configuration matter. Continuing the above example, the user has an account in a social network providing access through a web-site, socialnetwork.com, with the username user@socialnetwork.com. If the user utilizes GBA to authenticate himself to the service, he would still, for simplicity, like to be using that same account and username. If the user would be allowed to simply configure the username into the HSS/HLR 3, he could easily add an account of some other user, e.g. victimuser@ socialnetwork.com, to the HSS/HLR 3. This would allow him, as an attacker, to log into the other user's (the victim's) account in the service, i.e. to victimuser@ socialnetwork.com in this example.

Further, if the user wants to access an account with multiple 3GPP subscriptions using GBA, each of the subscriptions would need to be securely mapped to the same account in the NAF.

The above described lack of secure mapping of subscriptions to service account information is relevant also in other authentication situations, besides the described GBA case.

From the above it is clear that a secure way of adding service account information, such as for instance service user identity or username in a service of a service provider, to an operator network is needed. For instance, the adding of service account information to a HSS/HLR 3 of an operator network would be desirable.

SUMMARY

An object of the present disclosure is to solve or at least alleviate at least one of the above mentioned problems.

The object is according to a first aspect achieved by a method performed in a first network node for mapping a subscription in a network to a service user identity, wherein a communication device accesses the network using the subscription, and wherein the service user identity is used for accessing a service provided by the first network node. The method comprises receiving, from the communication device a request for a service, the request comprising an authenticated service user identity; providing, in response to the request, the communication device access to the service; receiving, from the communication device, a message comprising a token identifying a mapping of the service user identity to the subscription; and verifying that a service user identity obtained from the token corresponds to the service user identity used when providing access to the communication device.

An advantage provided by the method is that a user can access a single service account using both conventional username/password type of authentication as well as using GBA authentication. This is enabled by binding the service account to a subscription in a network (e.g. a 3GPP subscription in a wireless network) in a simple yet secure way. Another advantage provided by the method is its applicability for mapping multiple subscriptions (e.g. 3GPP subscriptions) to this single service account, making it possible to access the same account from various devices of the user (each device having a subscription), e.g. smartphone and tablet etc. Still another advantage provided by the method is that the user interaction is reduced to a minimum, which facilitates for the user as well as reduces risks of input errors.

The object is according to a second aspect achieved by a first network node for mapping a subscription in a network to a service user identity, wherein a communication device accesses the network using the subscription, and wherein the service user identity is used for accessing a service provided by the first network node. The first network node is configured to: receive, from the communication device a request for a service, the request comprising an authenticated service user identity; provide, in response to the request, the communication device access to the service; receive, from the communication device, a message comprising a token identifying a mapping of the service user identity to the subscription; and verify that a service user identity obtained from the token corresponds to the service user identity used when providing access to the communication device.

The object is according to a third aspect achieved by a computer program for a first network node. The computer program comprises instructions, which, when executed on at least one processor cause the at least one processor to carry out the method as above.

The object is according to a fourth aspect achieved by a computer program product comprising a computer program as above and a computer readable means on which the computer program is stored.

The object is according to a fifth aspect achieved by a method performed in a second network node for mapping a subscription in a network to a service user identity, wherein a communication device accesses the network using the subscription, and wherein the service user identity is used for accessing the service provided by a first network node. The method comprises receiving, from the first network node, a request for a service specific key for a communication device. The request comprises a bootstrapping transaction identifier binding the communication device to the subscription and a master key, comprising a shared secret between the communication device and the second network node of the network, and a token identifying a mapping of the service user identity to the subscription. The method comprises verifying a signature of the token using the master key, or a derivative thereof, and storing the mapping of the service user identity to the subscription in the network and the service for which the service user identity is to be used.

The object is according to a sixth aspect achieved by a second network node for mapping a subscription in a network to a service user identity, wherein a communication device accesses the network using the subscription, and wherein the service user identity is used for accessing the service provided by a first network node. The second network node is configured to receive, from the first network node, a request for a service specific key for a communication device. The request comprises a bootstrapping transaction identifier binding the communication device to the subscription and a master key comprising a shared secret between the communication device and the second network node of the network, and a token identifying a mapping of the service user identity to the subscription. The second network node is configured to verify a signature of the token using the master key or a derivative thereof, and store the mapping of the service user identity to the subscription in the network and the service for which the service user identity is to be used.

The object is according to a seventh aspect achieved by a computer program for a second network node, the computer program comprising instructions, which, when executed on at least one processor cause the at least one processor to carry out the method as above.

The object is according to an eight aspect achieved by a computer program product comprising a computer program as above and a computer readable means on which the computer program is stored.

The object is according to a ninth aspect achieved by a method performed in a communication device (for mapping a subscription in a network to a service user identity, wherein the communication device accesses the network using the subscription, and wherein the service user identity is used for accessing a service. The method comprises performing an authentication and key agreement procedure towards a second network node of the network, providing the communication device with a master key and a bootstrapping transaction identifier that binds the communication device to the master key; generating a token identifying a mapping of the service user identity to the subscription; signing and/or encrypting the token by using the master key or a derivative thereof; transmitting, to a first network node providing the service, a message comprising the bootstrapping transaction identifier and the token.

The object is according to a tenth aspect achieved by a communication device for mapping a subscription in a network to a service user identity, wherein the communication device accesses the network using the subscription, and wherein the service user identity is used for accessing a service. The communication device is configured to perform an authentication and key agreement procedure towards a second network node of the network, providing the communication device with a master key and a bootstrapping transaction identifier that binds the communication device to the master key; generate a token identifying a mapping of the service user identity to the subscription; sign and/or encrypt the token by using the master key or a derivative thereof; and transmit, to a first network node providing the service, a message comprising the bootstrapping transaction identifier and the token.

The object is according to an eleventh aspect achieved by a computer program for a communication device. The computer program comprising instructions, which, when executed on at least one processor cause the at least one processor to carry out the method as above.

The object is according to a twelfth aspect achieved by a computer program product comprising a computer program as above and a computer readable means on which the computer program is stored.

Further features and advantages of the present disclosure will become clear upon reading the following description and the accompanying drawings.

DETAILED DESCRIPTION

Figure 1:
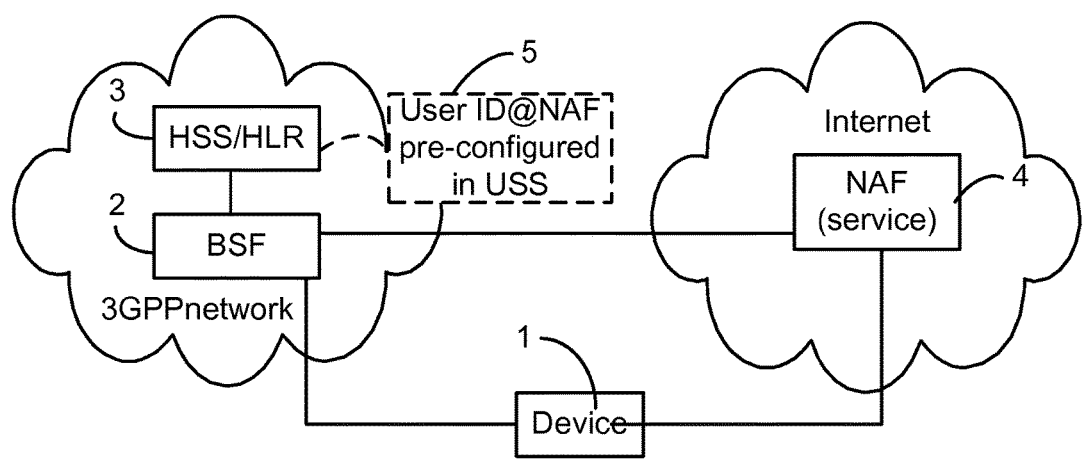
FIG. 1 illustrates schematically the known Generic Bootstrapping Architecture.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

As described in the background section, GBA specification 3GPP TS 330.220 specifies how GBA can be used to authenticate the user to a service using a 3GPP subscription, but does not define how user identities are set-up before GBA can be used for accessing a service account. There is thus no defined and secure way of adding service (NAF) account information, such as for instance service user identity or username used in the service, to the GUSS in the HSS/HLR 3. This has been left to be a configuration matter. This results in a possible threat of adding an account of some other user (e.g. victimuser@service.com) to the GUSS as also explained in the background section.

In an aspect of the present disclosure, a strong binding between a subscription, e.g. 3GPP subscription, and for instance a valid account/username of a user in a service is enabled.

In the following, aspects and embodiments of the present disclosure are described by using the GBA as an example. It is however noted that the methods of the present disclosure may be applied also to other authentication situations which could encounter the same difficulties and which would thus benefit from the methods of the present disclosure. An example of such other authentication situation comprises Kerberos, which is described briefly later.

When a user wants to add a GBA enabled device/subscription as a valid way of accessing a service account, he would need to prove that he owns both the service account and the subscription and also that the subscription is allowed to access the account using GBA. In an aspect, the present disclosure provides a way to do this. Likewise, if the user wants to access an account with multiple 3GPP subscriptions using GBA, each of the subscriptions would need to be securely bound to the same account in the NAF.

An advantage provided by the method is that a user can access a single service account using both conventional username/password type of authentication as well as using GBA authentication. This is enabled by binding the service account to a subscription in a wireless network (e.g. a 3GPP subscription) in a simple and secure way. Another advantage provided by the method is its applicability for mapping multiple subscriptions (e.g. 3GPP subscriptions) or rather devices to this single service account, making it possible to access the same account using regular username/password login and from various devices of the user, such as the user's smartphone and tablet etc. The solution relies on standardized methods and strong security. Furthermore, the user interaction is reduced to a minimum.

Figure 3:
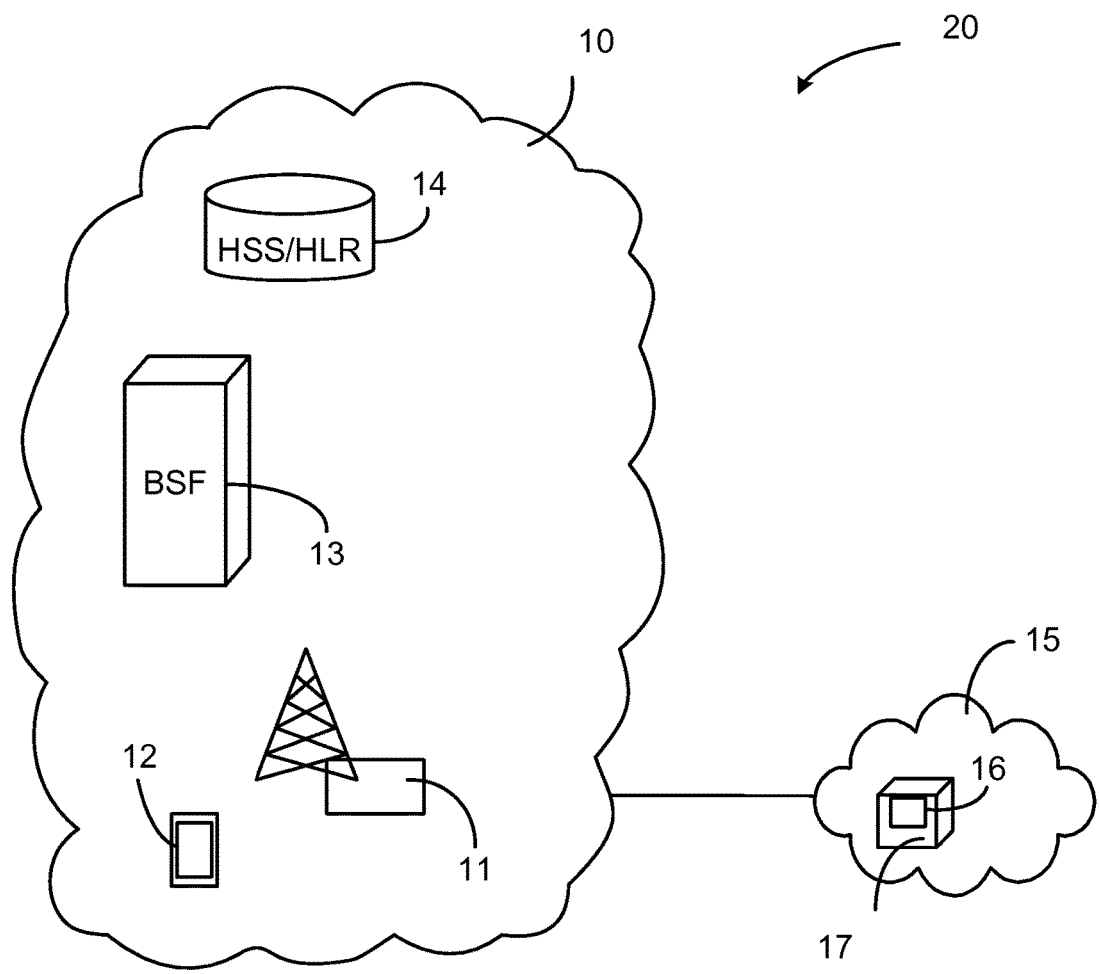
FIG. 3 illustrates schematically an environment in which embodiments of the present disclosure may be implemented.

FIG. 3 illustrates schematically an exemplary environment 20 in which embodiments of the present disclosure may be implemented. A communication system 20 comprises a wireless network 10, e.g. a Long Term Evolution (LTE) network, in turn comprising a number of network nodes 11 enabling devices 12 to communicate over wireless links. Such network nodes 11 may be denoted in different ways, e.g. radio access node, base station, radio base station, evolved node B (eNB) etc. The device 12 may comprise e.g. laptop computer, a tablet, a smart phone etc. Also the devices 12 may be denoted in different ways, e.g. mobile station, wireless device, denoted user equipment (UE) in LTE, etc. In the following the device 12 is referred to as UE 12, but it is to be understood that the device 12 could be any type of device used for accessing a service by using a subscription in the wireless network 10.

The wireless network 10 typically comprises various other network nodes, such as Mobility Management Entity (MME), or operation and maintenance (O&M) nodes, packet data network gateways, serving gateways etc. Network nodes and network elements relevant for the present disclosure comprise the BSF 13 and HSS/HLR 14. It is noted that although indicated as separate nodes, the BSF 13 and HSS/HLR 14 could be integrated in a single node.

The UE 12 may be used for accessing the BSF 13 of the wireless network 10 over wired or wireless links, i.e. using some type of access technology (wired or wireless). For accessing a service such as a social network, the UE needs to be able to handle IP connectivity, as the connection between the UE 12 and a NAF 16 is over IP.

The communication system 20 may also comprise computer networks 15, such as Internet. Various services are available in such computer networks 15 from different service providers. The services, e.g. applications, may be available by accessing for instance a server 17 of the computer network 15. In the context of the present disclosure, the services may be denoted NAF. The NAF is hosted in a network element, e.g. an application server. The NAF is illustrated as hosted by server 17 and is indicated at reference numeral 16. As a particular example, which is used in the present application as a recurring example, the computer network 15 may comprise a social network server, such as e.g. a Facebook server providing access to Facebook, and the service, i.e. the NAF, thus comprising Facebook.

It is noted that GBA requires a trust relationship between the operator of the BSF 13 and the operator of the NAF 16.

The UE 12 may comprise a Web browser, e.g. a Hypertext Transfer Protocol (HTTP) client, comprising a GBA extension for handling GBA authentication request from the BSF 13. The UE 12 is then a GBA enabled UE 12 with 3GPP credentials.

Aspects of the present disclosure will now be described with reference to FIG. 4. In the following, the terms "service" and "NAF" are used interchangeably for denoting a service which the user can access by authenticating himself. It is assumed that the user has created an account in the service, e.g. a social network, using conventional methods. An example of such conventional method comprises the user registering himself at a web site, e.g. socialnetwork.com, and thereby creating the account. It is further assumed that the user has traditional credentials, which usually comprise a username and a password selected by him. For instance, the username may be user@socialnetwork.com and the password may be SeCrEtPsWrd, and the user then uses these credentials for logging in to the service.

As a first step, indicated at arrow 1), the user uses his GBA enabled UE 12 to access the service using the traditional credentials. That is, he logs into the service that he requests, e.g. logs in to his existing social network account, using his social network—username and a password.

As a second step, indicated at arrow 2), one of two things might happen: a) the service to which the user logged in might notice that the UE 12 is a device, e.g. a mobile station, that supports GBA, or b) there might be an activation means for activating a GBA registration in the service, i.e. for registering the subscription for GBA-based authentication to the service.

In case of the scenario a) happening, i.e. the service notices that the UE 12 is a device supporting GBA, then steps according to arrow 3) and arrow 4) may follow. The service (NAF 16) may detect e.g. from a HTTP header that the UE 12 supports GBA. Assuming thus that the service has detected that the UE 12 supports GBA, the service may inquire (arrow 3) whether the user would like to map the UE 12 (or rather the subscription tied to the UE 12) to the service in order to be able to authenticate to the service in the future using GBA. Then, at arrow 4), the user confirms this, i.e. indicates his desire to be able to authenticate himself to the service using GBA. Variations of this are also possible. For instance, in case of scenario a) happening, the step according to arrow 5) could instead follow, wherein the step of arrow 5) is a combination of arrow 3) and arrow 5). That is, the service tries to get GBA registration/authentication performed by the UE 12, and this could be performed in different ways.

In case of the scenario b) happening at arrow 2), i.e. in case there is an activation means provided for activating the GBA authentication procedure, then steps according to arrows 3 and 4 may be omitted. Examples of such activation means comprise a link or a button on a web site from which the service is requested by means of which the user can activate the GBA authentication procedure. The user may thus simply press the link or button for activating the GBA authentication procedure. Such a link may for example indicate: "Add this phone to service account" or "Visit this site with mobile authentication".

Next, at step indicated by arrow 5), and as a result of step 2 or step 4, the service replies with a HTTP 401 message. This is an authentication request that is performed also in a conventional GBA authentication procedure when connecting to the service before having been authenticated to the service. Optionally, the service may include the username at the service, ID@NAF, e.g. user@socialnetwork.com, in the 401 message for use by the UE 12 later in the process.

Figure 2:
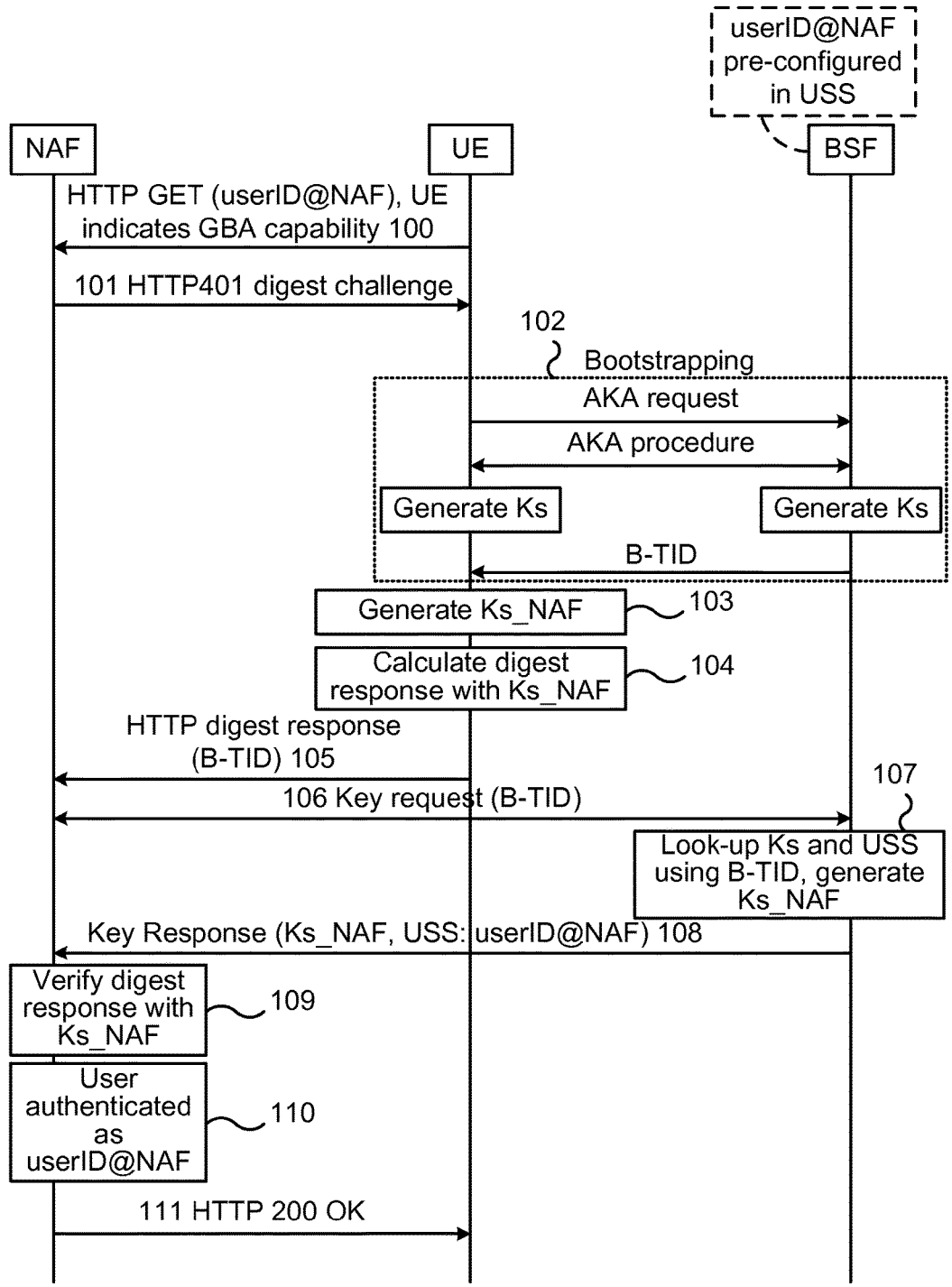
FIG. 2 illustrates the known Generic Bootstrapping Architecture in a sequence diagram.

At step indicated by arrow 6), the UE 12 may perform the bootstrapping procedure with the BSF in accordance with the conventional GBA (described earlier with reference to FIG. 2), and generate the master key Ks, the service specific key KsNAF and receive an identifier, in particular the B-TID (Bootstrapping Transaction Identifier), from the BSF 13. Some more detail on the authentication and generation of bootstrapping key material (Ks, B-TID) is given with reference to FIGS. 5A and 5B.

At step indicated by arrow 7), after the master key Ks has been generated, the UE 12 generates a token that identifies the mapping of the user account, e.g. username at the service, to the 3GPP subscription. That is, the token is used for mapping the service user identity to the 3GPP subscription identity and comprises at least the service user identity (e.g. ID@NAF).

The service user identity or user name, for example ID@NAF (user@ socialnetwork.com), may have been received by the UE 12 in step 5, i.e. included in the HTTP 401 response received from the NAF 16. Alternatively, the user account or user name may be known by the UE 12 based on the UE 12 being logged in to that user account using that username. The 3GPP subscription may be identified by the IMSI or IMPI, a derivative of the IMSI or IMPI or some other subscription specific data, e.g. the B-TID, which can be mapped back to the 3GPP subscription at the BSF 13. The token proves that both the user of the UE 12 and the service provider of the service are agreed upon the mapping of the service user identity to the 3GPP subscription identity.

According to an embodiment, the token is encrypted while in another embodiment the token is unencrypted.

This token is then signed and possibly encrypted using the master key Ks or a derivative of the master key Ks or using the key KsNAF. This signing/encrypting is done in order to prove that the user wants to map the 3GPP subscription to the specified service account. This also protects against unauthorized entities changing the mapping. If the NAF 16 cannot be trusted, a derivative of Ks is preferably used, since only the UE 12 and the BSF 13 will have the master key Ks during the username registration process. The token thus proves that only the UE 12 can have generated the token.

An advantage of only signing the token, and not encrypting it, is that the NAF 16 can verify that the service account/username provided in the token is that of the currently logged in user. If the token is encrypted using the KsNAF, the NAF 16 may still verify that the username provided in the token is that of the logged in user after it has obtained the KsNAF from the BSF 13.

However, it is noted that encryption is optional and that it is enough that the username at the service, e.g. user@socialnetwork.com or more generally ID@NAF, is signed using either the master key Ks or key KsNAF (or a derivative of Ks or KsNAF). Since the B-TID is anyway communicated all the way to the BSF 13 along with the token, the BSF 13 can retrieve the correct corresponding master key Ks or KsNAF (or a derivative of Ks or KsNAF) for verifying the signature and thereby identifying the 3GPP subscription.

At step indicated by arrow 8), the UE 12 replies to the HTTP 401 message received from the NAF 16 (at arrow 5) by using the key KsNAF and the identifier B-TID, which is in correspondence with conventional GBA. However, unlike prior art, the communication device 12 includes the signed and possibly encrypted token in the reply.

At step indicated by arrow 9), the NAF 16 may, if the token is not encrypted, verify that the included username is the same as with which the user is currently logged in.

At step indicated by arrow 10), the NAF 16 communicates the B-TID to the BSF 13 just as in conventional GBA, but in addition includes the token in the exchange.

At step indicated by arrow 11), the BSF 13 can, based on the B-TID, look up the bootstrapping context and find the master key Ks and generate the NAF specific key KsNAF. In addition, the BSF 13 can verify the signature of the token or decrypt the token if it is encrypted by using the master key Ks or the key KsNAF (or a derivative of Ks or KsNAF). The BSF 13 may now store the mapping of username-service/NAF into HSS/HLR 14 for the defined 3GPP subscription. The 3GPP subscription is identified through the provided B-TID. This data may be stored in the GBA User Security Settings (GUSS) of the subscription, in the USS of the specific service/NAF.

At step indicated by arrow 12), the BSF 13 replies to the NAF 16, just as in regular GBA, providing the KsNAF and optionally the User Security Settings (USS) for the service including the mapped service user identity in the USS.

The MSISDN of the subscription, i.e. the phone number, could be included in the USS to indicate to which 3GPP subscription the service user identity was registered to. If the token was encrypted using the key KsNAF, the NAF 16 can still verify that the registered username is the one of the current service account, i.e. the service account to which the UE 12 is logged in. The NAF 16 may now add to the service account information that the account is also accessible using GBA from the subscription with the specified phone number. The use of phone number has the advantage of being user friendly in that the user is able to easily check the phone numbers associated with his account. Phone number is just an example of a setting that is easily comprehended by the user, and other usernames that are easy to understand and/or easy to remember could be included in this reply message from the BSF 13 to the NAF 16.

At step indicated at arrow 13), the NAF 16 may reply to the UE 12 with a HTTP 200 OK message, acknowledging that the GBA based authentication has been done successfully and that the username has been registered for GBA use.

Now, when the added UE 12 (or rather added 3GPP subscription tied to the UE 12) later wants to connect and authenticate itself to the service using GBA instead of regular username/password, the NAF 16 may in the reply from the BSF 13 get the USS which contains the registered username of the account as the username to be used in the service, thus enabling GBA based access to that service account, just as in conventional GBA.

Figure 4:
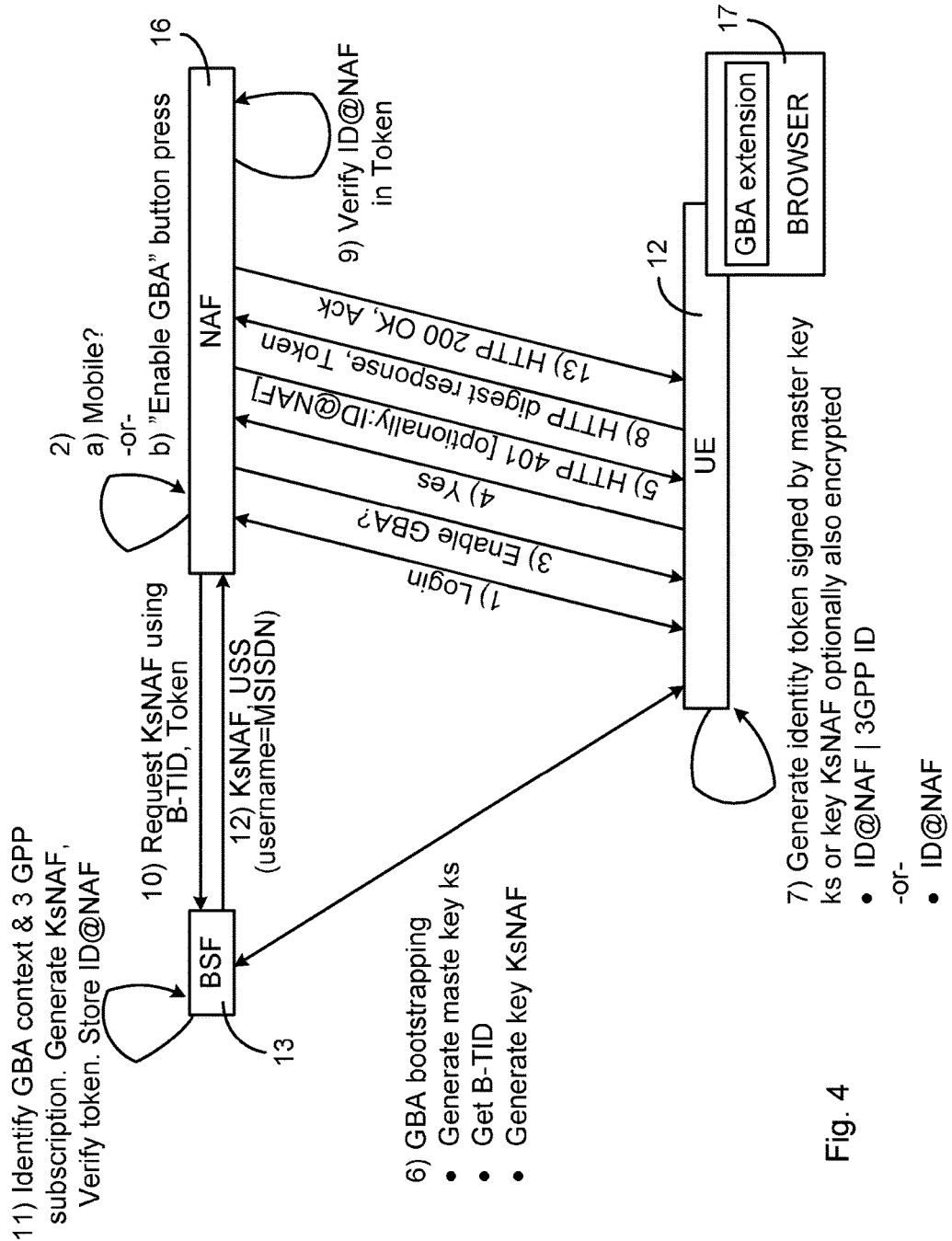
FIG. 4 illustrates a flow of steps in an embodiment of the present disclosure.
Figure 5A:
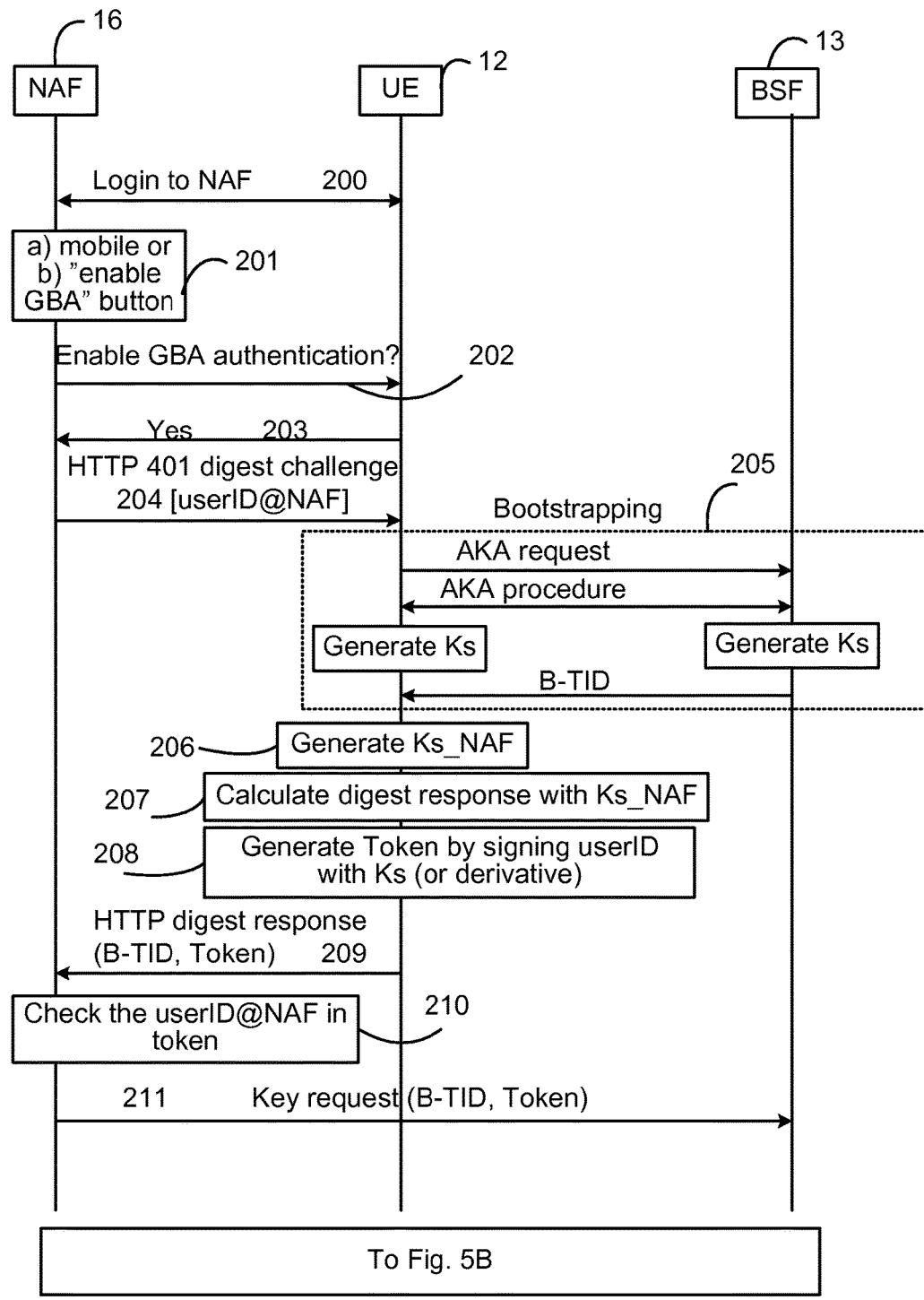
FIGS. 5A and 5B is a sequence diagram illustrating an authentication session according to embodiments of the present disclosure.
Figure 5B:
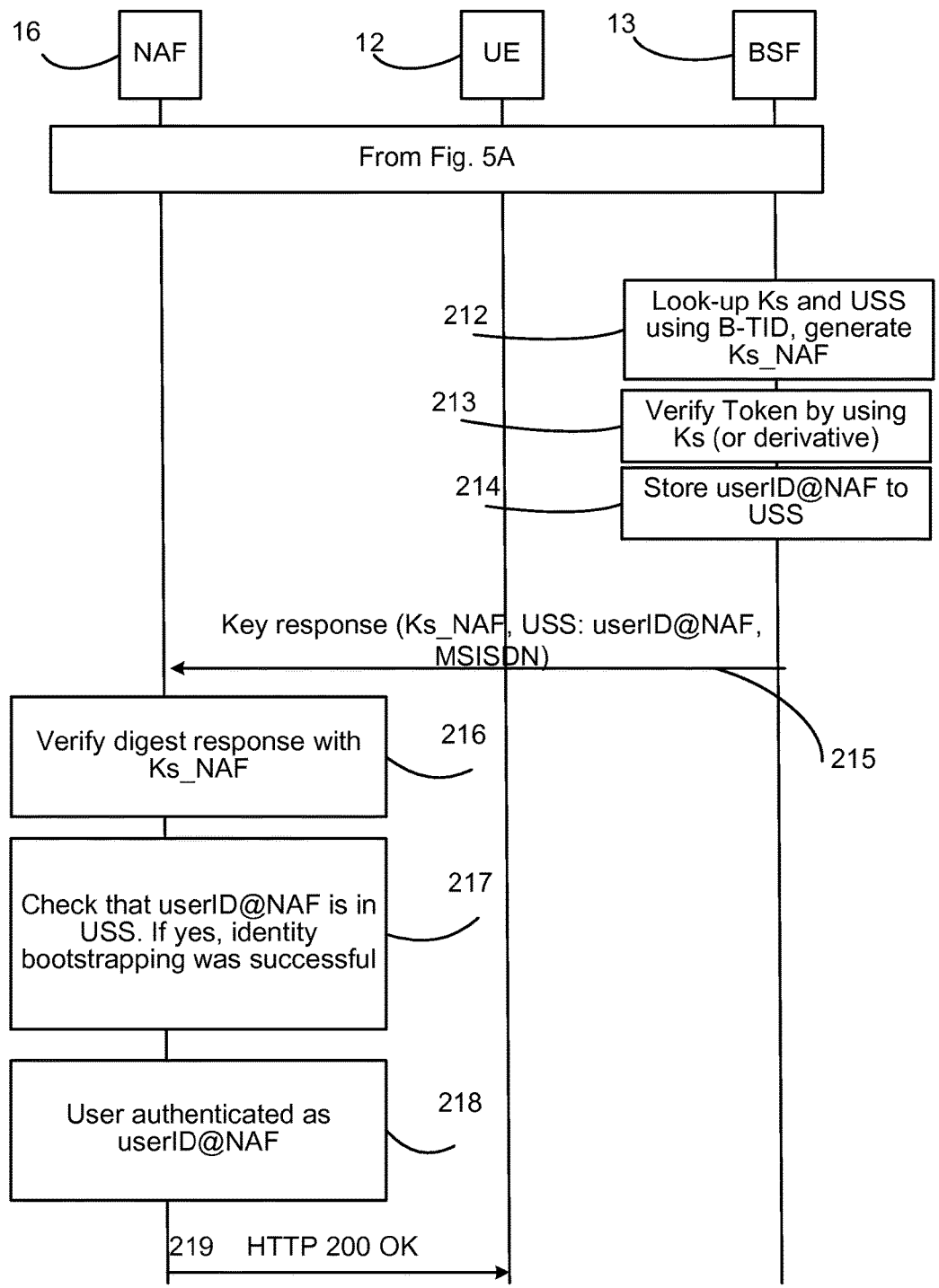

FIGS. 5A and 5B is a sequence diagram illustrating an authentication session according to an embodiment of the present disclosure. In particular, FIGS. 5A and 5B illustrates in a sequence diagram aspects of the disclosure described in relation to FIG. 4. FIG. 5B is a continuation of FIG. 5A.

It is initially noted that the BSF 13 does not have any knowledge of the service user identity for the UE 12 (or rather of the user of the UE 12). That is, the service user identity userID@NAF is not preconfigured in the USS of the BSF 13.

At arrow 200, there is a message exchange between the UE 12 and the NAF 16 that the user wants to access. In particular, the UE 12 logs in to the NAF 16 with his user identity at the NAF 16: userID@NAF and a password. The UE 12 may indicate that it is GBA capable. The UE 12 may for example be GBA capable by comprising a GBA extension for handling GBA authentication requests from the BSF 13.

Next, at box 201, the NAF 16 may provide the UE 12 with a means, e.g. a link to a web page (also see arrow 2) of FIG. 4), to map the UE 12 or subscription to the NAF 16 in order to be able to authenticate itself to the NAF 16 in the future by simply using GBA.

At arrow 202, the NAF 16 thus inquires the UE 12 if it would like to enable GBA registration, i.e. registering the subscription for GBA-based authentication to the service. At arrow 203, the UE 12 confirms this.

At arrow 204, the NAF 16 sends a message with a challenge, e.g. an HTTP 401 message. This is also done in prior art GBA procedure, compare e.g. arrow 101 of FIG. 2. However, in accordance with the present disclosure, this message may also comprise the service user identity, i.e. userID@NAF.

At box 205, the UE 12 and the BSF 13 performs an authentication and key agreement (AKA) procedure, which may also be called a bootstrapping authentication procedure. The AKA procedure is initiated by the UE 12 by sending a message, an AKA request, to the BSF 13. The AKA request comprises an identifier of the subscription, in particular IMSI. In this procedure, there are some steps (i.e. communication) involved between the BSF 13 and the HSS/HLR 14 (not illustrated in FIGS. 5A, 5B), wherein the BSF 13 e.g. asks for an authentication vector (AV) for the UE 12 identified by the received IMSI. The HSS/HLR 14 replies to this with a random value (RAND), a network authentication value (AUTN), an expected authentication result (XRES) and the GBA User Security Settings (GUSS) of the user. The communication between the BSF 13 and HSS/HLR 14 is not described in more detail herein. In the AKA procedure the BSF 13 and the UE 12 authenticate each other and generate a master key Ks. The BSF 13 sends a message to the UE 12 comprising the B-TID.

At box 206, the UE 12 generates the NAF specific key KsNAF and at box 207 the UE 12 calculates a digest response to the digest challenge message received at arrow 204.

At box 208, the UE 12 generates a token by signing the service user identity with the master key Ks or a derivative thereof. During this service user identity registration process, only the UE 12 and the BSF 13 have the master key Ks and the token thus proves that it is the UE 12 that indeed has generated the token.

At arrow 209, the UE 12 sends a HTTP digest response to the NAF 16 comprising the B-TID and the token.

At arrow 210, the NAF 16 establishes whether the service user identity, userID@NAF, in the token is the same as the one that the UE 12 is currently logged in as, e.g. if the user identity in the token is the same as the user identity that the NAF 16 sent earlier at arrow 204. If the token is not encrypted, the NAF 16 can verify this correspondence between the user identity currently used and the user identity received in the token. If the token is encrypted, the verification has to be performed in the BSF 13. The NAF 16 may later verify the user identity in the token once it gets the key KsNAF from the BSF 13 if the token is encrypted with KsNAF. The NAF 16 may likewise verify the registered user identity from information communicated to it in the USS (refer to box 205 and related description).

At arrow 211, the NAF 16 sends a key request to the BSF 13, the request comprising the B-TID and the token received from the UE 12 earlier at arrow 209.

The sequence diagram continues in FIG. 5B.

At box 212, the BSF 13 uses the B-TID to look up the correct bootstrapping context and finds the master key Ks by using the B-TID. The BSF 13 further generates the KsNAF.

At box 213, the BSF 13 verifies the token by using the master key Ks or a derivative thereof.

At box 214, the BSF 13 stores the mapping of the user identity at the service for the subscription, which is identified through the provided B-TID. This is a secure binding of the user identity at the service to the subscription of the UE 12 in the HLR/HSS 14. Since the token was signed by the UE 12, and since the token comes from a trusted NAF 16, the BSF 13 can be sure that the identity bootstrapping was legitimate.

At arrow 215, the BSF 13 sends a response message to the NAF 16, the message comprising a key response comprising the NAF specific key KsNAF and the user identity, userID@NAF. In accordance with the present disclosure, preferably also some user security setting (USS) such as or the phone number, i.e. MSISDN, of the UE 12 is included in the response message to the NAF 16. The user identity, userID@NAF, may be sent as part of the USS or as a separate parameter.

At box 216, the NAF 16 verifies the digest response (i.e. the above response message of arrow 209) by using the KsNAF.

At box 217, the NAF 16 verifies that the user identity, userID @NAF, is in the USS, or in a separate parameter if no USS has been given. If it is, then the identity bootstrapping was successful. If the userID@NAF received from BSF 13, either in USS or as a separate parameter, does not match the currently logged in user, then the NAF 16 may indicate to the BSF 13 that the userID@NAF identity should be removed since it is not valid. This could happen if e.g. the token is encrypted by the UE 12. In this case the NAF 16 has not access to the contents of the token and only gets the user account information from the BSF 13 in the key response message. If the BSF 13 does not provide any username for the service it may indicate that no username has been registered.

At box 218, the user is authenticated as a valid user with service user identity userID@NAF, and at arrow 219, the NAF 16 sends an HTTP 200 message to the UE 12 acknowledging that the GBA-based authentication has been done successfully and that the service user identity has been registered for future GBA use.

When the UE 12, having done the procedure as described above, wants to log in to this particular NAF 16 the next time the NAF 16 will in the reply from the BSF 13 get the USS which contains the registered user identity to the service account, which original user identity is to be used in the NAF 16. A GBA based access to the NAF 16 is thus enabled.

Figure 6:
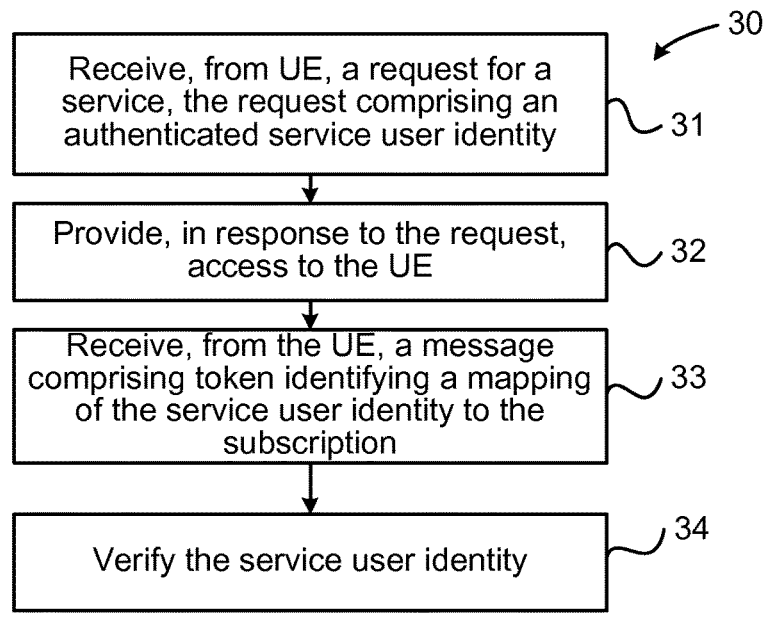
FIG. 6 illustrates a flow chart over steps of a method in a first network node in accordance with the present disclosure.

FIG. 6 illustrates a flow chart over steps of a method in a first network node in accordance with the present disclosure. The method 30 performed in a first network node 16 is provided for mapping a subscription in a network 10 to a service user identity, wherein a communication device 12 accesses the network 10 using the subscription, and wherein the service user identity is used for accessing a service provided by the first network node 16. The method 30 comprises receiving 31, from the communication device 12 a request for a service, the request comprising an authenticated service user identity.

The method 30 comprises providing 32, in response to the request, the communication device 12 access to the service.

The method 30 comprises receiving 33, from the communication device 12, a message comprising a token identifying a mapping of the service user identity to the subscription.

The method 30 comprises verifying 34 that a service user identity obtained from the token corresponds to the service user identity used when providing access to the communication device 12.

The method 30 is applicable for instance for GBA authentication.

In an embodiment, the method 30 comprises sending, in response to a successful verification of the service user identity from the token, a message comprising the token to a second network node 13, the message further comprising an identifier of the communication device 12 or the subscription in the second network node 13, and receiving, from the second network node 13, an indication that a mapping of the subscription to the service user identity was successful. It is noted that for the case of GBA, the identifier may be the B-TID. B-TID is an identifier of an authentication context, and from that context the identity of the communication device 12 may be obtained.

In an embodiment, the token is signed by the communication device 12 and the message comprising the token further comprises a bootstrapping transaction identifier, B-TID, binding the communication device 12 to a master key, Ks, comprising a shared secret between the communication device 12 and the second network node 13 of the network 10.

In an embodiment, the method 30 comprises, prior to the sending the message comprising the token to a second network node 13:

transmitting, to the second network node 13, a message requesting a service specific key, KsNAF, for the communication device 12, the message comprising the bootstrapping transaction identifier, B-TID, and the token, and receiving, from the second network node 13, a response message comprising the requested service specific key, KsNAF, and an indication that a mapping of the subscription to the service user identity was successful.

In an embodiment, the indication that the mapping was successful comprises the response message comprising the service user identity.

In an embodiment, the response message further comprises information related to the subscription, and the method 30 comprises storing the received information as account information.

In an embodiment, the information related to the subscription comprises a mobile subscriber integrated services digital network number, MSISDN.

In an embodiment, the method 30 comprises, after the providing 32 access and prior to the receiving 33 a message, providing the communication device 12 a trigger for activating a bootstrapping procedure for mapping of the subscription to the service user identity.

In an embodiment, the method 30 comprises transmitting, to the communication device 12, a message confirming that an account accessed using the service user identity is accessible using a generic bootstrapping architecture, GBA, procedure.

In an embodiment, the token is encrypted.

As indicated earlier, aspects and embodiments of the present disclosure have been described by using the GBA as an example. It is however noted that the methods of the present disclosure may be applied also to other authentication situations. GBA may be used for accessing 3GPP core network from wired computer networks, i.e. as opposed to wireless networks.

One such example of alternative to GBA is Kerberos, which is described briefly in the following. Kerberos is another network authentication mechanism which provides functionality similar to GBA. Kerberos allows communicating nodes (compare UE 12 and NAF 16) to authenticate each other over a non-secure network by relying on a trusted third party (compare BSF 13). In Kerberos, first, a client authenticates itself to an Authentication Server (AS) by providing a username, which the AS then forwards to a Key distribution center (KDC). Upon receiving the username, the KDC, issues a Ticket Granting Ticket (TGT), which is time stamped, and encrypts it using the user's password. The KDC then returns the encrypted result to the user. This process may be performed infrequently, typically only at user login or when the TGT expires at some point.

When the client needs to communicate with another node which is also known as the "principal" node, the client sends the TGT to the Ticket Granting Service (TGS), which typically resides on the same host as the KDC. After verifying that the TGT is valid and the user is permitted to access the requested service, the TGS issues a Ticket and session keys, which are then returned to the client. The client then sends the Ticket to the service server (SS) along with its service request.

Conventional Kerberos may use an Enterprise Identity Mapping domain (EIM). EIM is basically a look-up table where each user's identities (user IDs) in different user registries (target platforms and applications such as social networks etc.) are mapped to a source identity in the KDC.

While the current state-of-the-art requires manual configuration of this lookup table, in accordance with an aspect of the present disclosure, automatic population of the lookup table may be allowed. The user may login to a desired application using his conventional credentials (user@socialnetwork.com/password) and indicate his desire to use a Kerberos identity to login henceforth. An application server comprising the desired application (compare NAF 16 for the GBA case) may then contact the KDC indicating this request and also provide the Kerberos identity supplied by the user. The KDC may then confirm with the user about the mapping and then populate the lookup table. Thereafter, the user can use the Kerberos identity in the KDC to login into the desired application, e.g. a social network.

For instance, after logging in using conventional credentials, the UE 12 may re-login using Kerberos, i.e. create a TGT and send it together with the service identifier to the TGS. Optionally the message may comprise an indication that it will be used for EIM identity registration. The TGS creates the session ticket, which will contain the "root-ID" of the user in Kerberos system and sends it together with a session key to the UE 12. The UE 12 may then present the ticket and an authenticator to the service using the regularly logged in session. The service may decrypt the ticket and find the Kerberos username. From the authenticator the service would in standard Kerberos find the same Kerberos username as in the ticket. According to the present disclosure, the username may instead be the username used for logging in to the service. Alternatively, the Authenticator may comprise an additional field compared to standard Kerberos, which can be used for including the logged in username in the authenticator. The service has now learned the mapping between the Kerberos root-ID and the logged in username, and it has received the ticket and authenticator through a logged in session with the same username as in the authenticator, proving that the client owns both identities.

The service may store the mapping between the Kerberos root-ID and the logged in username locally or it may communicate this mapping to the EIM.

The token identifying the mapping of the service user identity to the subscription, described in relation to the GBA case may thus, for the Kerberos case, comprise the message from the user client containing the ticket and the authenticator, wherein the authenticator comprises the username used for logging in to the service. The 3GPP subscription of the GBA case is the Kerberos root-ID for the Kerberos case. The application server providing the service may for the Kerberos case verify that a service user identity obtained from the token corresponds to the service user identity used when providing access to the user client by having learned the mapping as described above.

The method 30 described in relation to FIG. 6 may be performed also for the Kerberos case. The first network node 16 is then the above mentioned application server, wherein a communication device 12 (client) accesses the network 10 using a subscription (Kerberos Root-ID), and wherein the service user identity (logged in username in authenticator) is used for accessing a service provided by the first network node 16 (application server). The method 30 comprises receiving 31, from the communication device 12 (client) a request for a service, the request comprising an authenticated service user identity.

The method 30 comprises providing 32, in response to the request, the communication device 12 (client) access to the service.

The method 30 comprises receiving 33, from the communication device 12 (client), a message comprising a token identifying a mapping of the service user identity to the subscription. For the Kerberos case, the token may be the message from the user client containing the ticket and authenticator.

The method 30 comprises verifying 34 that a service user identity obtained from the token corresponds to the service user identity used when providing access to the communication device 12. The verification may for instance comprise the described mapping.

The method 30 is thus applicable also for, for instance, for Kerberos authentication.

Figure 7:
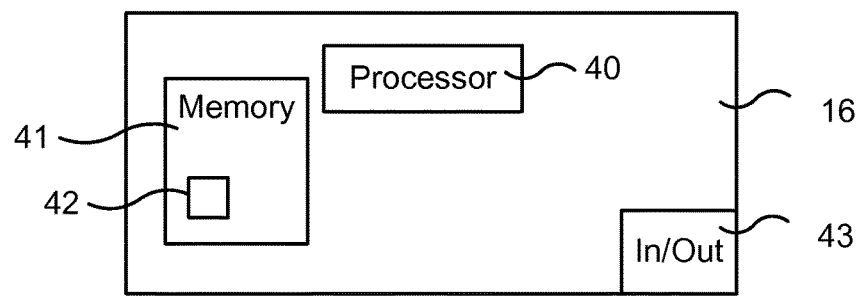
FIG. 7 illustrates schematically a first network node and means for implementing embodiments of methods of the present disclosure.

FIG. 7 illustrates schematically a first network node and means for implementing embodiments of methods of the present disclosure. The first network node 16, e.g. the NAF, may comprise a processor 40 comprising any combination of one or more of a central processing unit (CPU), multi-processor, microcontroller, digital signal processor (DSP), application specific integrated circuit etc. capable of executing software instructions stored in a memory 41, which can thus be a computer program product 41. The processor 40 can be configured to execute any of the various embodiments of the method as has been described, for instance in relation to FIG. 6.

The first network node 16 may further comprise one or more input and output devices 43, denoted In/Out in the FIG. 7, constituting an interface for communication exchange with e.g. other network nodes such as BSF 13 of a wireless network 10.

A first network node 16 is provided for mapping a subscription in a network 10 to a service user identity, wherein a communication device 12 accesses the network 10 using the subscription, and wherein the service user identity is used for accessing a service provided by the first network node 16. The first network node 16 is configured to:
  receive, from the communication device 12 a request for a service, the request comprising an authenticated service user identity,
  provide, in response to the request, the communication device 12 access to the service,
  receive, from the communication device 12, a message comprising a token identifying a mapping of the service user identity to the subscription, and
  verify that a service user identity obtained from the token corresponds to the service user identity used when providing access to the communication device 12.

The first network node 16 may communicate with the communication device 12 via the wireless network 10.

The first network node 16 may be configured to perform the embodiments of the method e.g. by comprising the processor 40 and the memory 41 containing instructions, e.g. computer program code, executable by the processor 40. When the instructions are executed on the processor 40, the first network node 16 is caused to perform an embodiment of the method 30.

In an embodiment, the first network node 16 is configured to:
  send, in response to a successful verification of the service user identity from the token, a message comprising the token to a second network node 13, the message further comprising an identifier of the communication device 12 or the subscription in the second network node 13, and
  receive, from the second network node 13, an indication that a mapping of the subscription to the service user identity was successful.

In an embodiment, the token is signed by the communication device 12 and the message comprising the token further comprises a bootstrapping transaction identifier, B-TID, binding the communication device 12 to a master key, Ks, comprising a shared secret between the communication device 12 and a second network node 13 of the network 10.

In an embodiment, the first network node 16 is configured to, prior to sending the message comprising the token to the second network node 13:
  transmit, to the second network node 13, a message requesting a service specific key, KsNAF, for the communication device 12, the message comprising the bootstrapping transaction identifier, B-TID, and the token, and
  receive, from the second network node 13, a response message comprising the requested service specific key, KsNAF, and an indication that a mapping of the subscription to the service user identity was successful.

In an embodiment, the indication that the mapping was successful comprises the response message comprising the service user identity.

In an embodiment, the response message further comprises information related to the subscription, and the first network node 16 is configured to store the received information as account information.

In an embodiment, the information related to the subscription comprises a mobile subscriber integrated services digital network number, MSISDN.

In an embodiment, the first network node 16 is configured to, after the providing access and prior to the receiving a message, provide the communication device 12 a trigger for activating a bootstrapping procedure for mapping of the subscription to the service user identity.

In an embodiment, the first network node 16 is configured to transmit, to the communication device 12, a message confirming that an account accessed using the service user identity is accessible using a generic bootstrapping architecture, GBA, procedure.

In an embodiment the token is encrypted.

Still with reference to FIG. 7, the memory 41 may be a random access memory (RAM), read only memory (ROM), Flash memory, magnetic tape, Compact Disc (CD)-ROM, digital versatile disc (DVD), Blueray disc etc. The memory 41 may also comprise persistent storage, which may, for example, be any single one or combination of magnetic memory, optical memory, solid state memory or even remotely mounted memory.

A data memory (not illustrated in FIG. 7) may also be provided for reading and/or storing data during execution of software instructions in the processor 40. Such data memory may for instance comprise random access memory (RAM) and/or read only memory (ROM).

The present disclosure also encompasses a computer program product 41 comprising a computer program 42 for implementing the methods as described above, and a computer readable means on which the computer program 42 is stored. The present disclosure thus comprise a computer program 42 comprising computer program code, which, when executed on at least one processor 40 of the first network node 16 causes the first network node 16 to perform the method 30 according to any of the embodiments that have been described.

The computer program product, or the memory, thus comprises instructions executable by the processor 40. Such instructions may be comprised in a computer program, or in one or more software modules or function modules.

Figure 8:
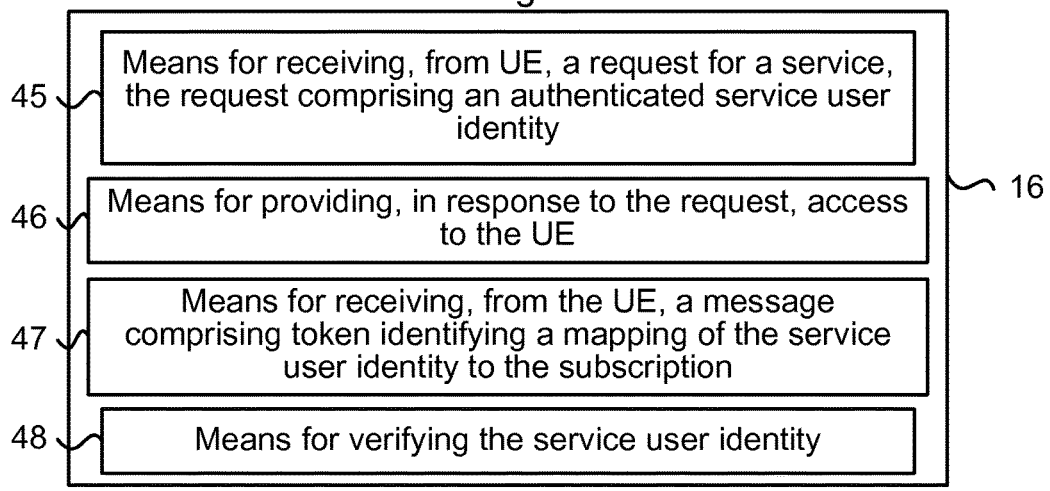
FIG. 8 illustrates a first network node comprising function modules/software modules for implementing embodiments of methods of the present disclosure.

FIG. 8 illustrates a first network node comprising function modules/software modules for implementing embodiments of methods of the present disclosure. The first network node 16 may comprise first means 45, for example a first function module, for receiving, from the communication device 12 a request for a service, the request comprising an authenticated service user identity. Such first means 45 may for example comprise processing circuitry configured to receive the request via an interface.

The first network node 16 may comprise second means 46, for example a second function module, for providing, in response to the request, the communication device 12 access to the service. Such second means 46 may for example comprise processing circuitry configured to provide access to the service.

The first network node 16 may comprise third means 47, for example a third function module, for receiving, from the communication device 12, a message comprising a token identifying a mapping of the service user identity to the subscription. Such third means 47 may for example comprise processing circuitry configured to receive the message.

The first network node 16 may comprise fourth means 48, for example a fourth function module, for verifying that a service user identity obtained from the token corresponds to the service user identity used when providing access to the communication device 12. Such fourth means 48 may for example comprise processing circuitry configured to perform such verification.

The mentioned first, second, third and fourth means 45, 46, 47, 48, as well as further means (not illustrated in the figure) for implementing the various steps of the method, can be implemented using software instructions such as computer program executing in a processor and/or using hardware, such as application specific integrated circuits, field programmable gate arrays, discrete logical components etc.

The first network node 16 may thus for instance comprise processing circuitry, adapted to do perform the various method steps using program code stored in memory. The means may comprise various processing circuitry, e.g. processing circuitry, adapted to perform the various functions, e.g. receiving, verifying, transmitting, by using program code stored in memory, and/or processing circuitry for transmitting and/or processing circuitry for receiving.

Figure 9:
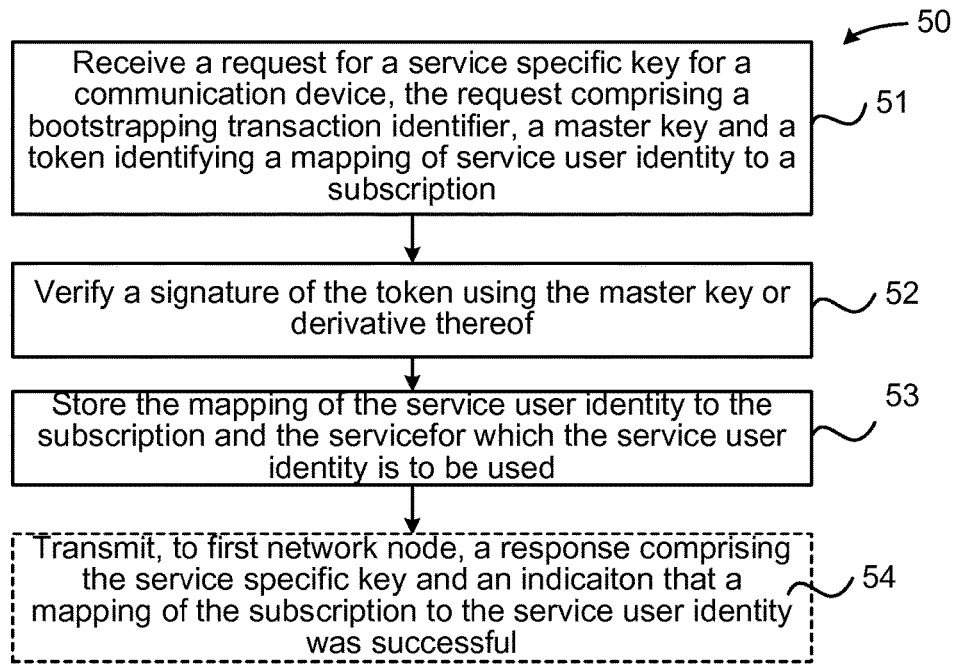
FIG. 9 illustrates a flow chart over steps of a method in a second network node in accordance with the present disclosure.

FIG. 9 illustrates a flow chart over steps of a method in a second network node in accordance with the present disclosure. The method 50 is performed in a second network node, e.g. the BSF 13, for mapping a subscription in a network 10 to a service user identity, wherein the communication device 12 accesses the network 10 using the subscription, and wherein the service user identity is used for accessing the service provided by a first network node 16, e.g. the NAF 16. The method 50 comprises receiving 51, from the first network node 16, a request for a service specific key, KsNAF, for a communication device 12. The request comprises:
- a bootstrapping transaction identifier, B-TID, binding the communication device 12 to the subscription and a master key, Ks, comprising a shared secret between the communication device 12 and the second network node 13 of the network 10, and
- a token identifying a mapping of the service user identity to the subscription, The method 50 comprises verifying 52 a signature of the token using the master key, Ks, or a derivative thereof.

The method 50 comprises storing 53 the mapping of the service user identity to the subscription in the network 10 and the service for which the service user identity is to be used. The mapping of service user name and corresponding service may be stored e.g. in the HSS/HLR for the subscription at hand.

It is noted that before the receiving 51 a request for a service specific key, a GBA bootstrapping between the communication device 12 and the second network node, e.g. the BSF 13, has been performed.

In an embodiment, the method 50 comprises generating a service specific key, KsNAF, using the master key, Ks, and transmitting 54, to the first network node 16, a response comprising the service specific key, KsNAF, and an indication that a mapping of the subscription to the service user identity was successful. This is an optional step, which is indicated by the box 54 of FIG. 9 comprising dashed lines.

In an embodiment, the transmitting 54 further comprises transmitting user security settings comprising the mapped service user identity.

Figure 10:
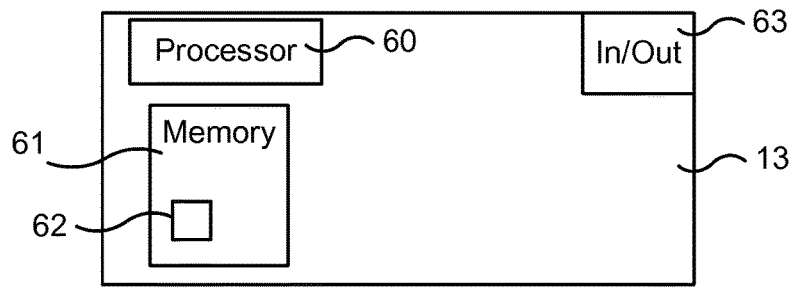
FIG. 10 illustrates schematically a second network node and means for implementing embodiments of methods of the present disclosure.

FIG. 10 illustrates schematically a second network node and means for implementing embodiments of methods of the present disclosure.

The second network node 13, e.g. the BSF, may comprise a processor 60 comprising any combination of one or more of a central processing unit (CPU), multiprocessor, microcontroller, digital signal processor (DSP), application specific integrated circuit etc. capable of executing software instructions stored in a memory 61, which can thus be a computer program product 61. The processor 60 can be configured to execute any of the various embodiments of the method as has been described, for instance in relation to FIG. 9.

The second network node 13 may further comprise one or more input and output devices 63, denoted In/Out in the FIG. 10, constituting an interface for communication exchange with e.g. other nodes such as NAF 16.

A second network node 13 is provided for mapping a subscription in a network 10 to a service user identity, wherein a communication device 12 accesses the network 10 using the subscription, and wherein the service user identity is used for accessing the service provided by a first network node 16. The second network node 13 is configured to:
- receive, from the first network node 16, a request for a service specific key, KsNAF, for a communication device 12, the request comprising:
  - a bootstrapping transaction identifier, B-TID, binding the communication device 12 to the subscription and a master key, Ks, comprising a shared secret between the communication device 12 and the second network node 13 of the network 10, and
  - a token identifying a mapping of the service user identity to the subscription,
- verify a signature of the token using the master key, Ks, or a derivative thereof, and
- store the mapping of the service user identity to the subscription in the network 10 and the service for which the service user identity is to be used.

The second network node 13 may be configured to perform the embodiments of the method e.g. by comprising the processor 60 and the memory 61 containing instructions, e.g. computer program code, executable by the processor 60. When the instructions are executed on the processor 60, the second network node 13 is caused to perform an embodiment of the method 50.

In an embodiment, the second network node 13 is configured to generate a service specific key, KsNAF, using the master key, Ks, and transmit, to the first network node 16, a response comprising the service specific key, KsNAF, and an indication that a mapping of the subscription to the service user identity was successful.

In an embodiment, the second network node 13 is configured to further transmit user security settings comprising the mapped service user identity.

Still with reference to FIG. 10, the memory 61 may be a random access memory (RAM), read only memory (ROM), Flash memory, magnetic tape, Compact Disc (CD)-ROM, digital versatile disc (DVD), Blueray disc etc. The memory 61 may also comprise persistent storage, which may, for example, be any single one or combination of magnetic memory, optical memory, solid state memory or even remotely mounted memory.

A data memory (not illustrated in FIG. 10) may also be provided for reading and/or storing data during execution of software instructions in the processor 60. Such data memory may for instance comprise random access memory (RAM) and/or read only memory (ROM).

The present disclosure also encompasses a computer program product 61 comprising a computer program 62 for implementing the methods as described above, e.g. in relation to FIG. 9, and a computer readable means on which the computer program 62 is stored. The present disclosure thus comprise a computer program 62 comprising computer program code, which, when executed on at least one processor 60 of the second network node 13 causes the second network node 13 to perform the method 50 according to any of the embodiments that have been described.

The computer program product, or the memory, thus comprises instructions executable by the processor 40. Such instructions may be comprised in a computer program, or in one or more software modules and/or function modules.

Figure 11:
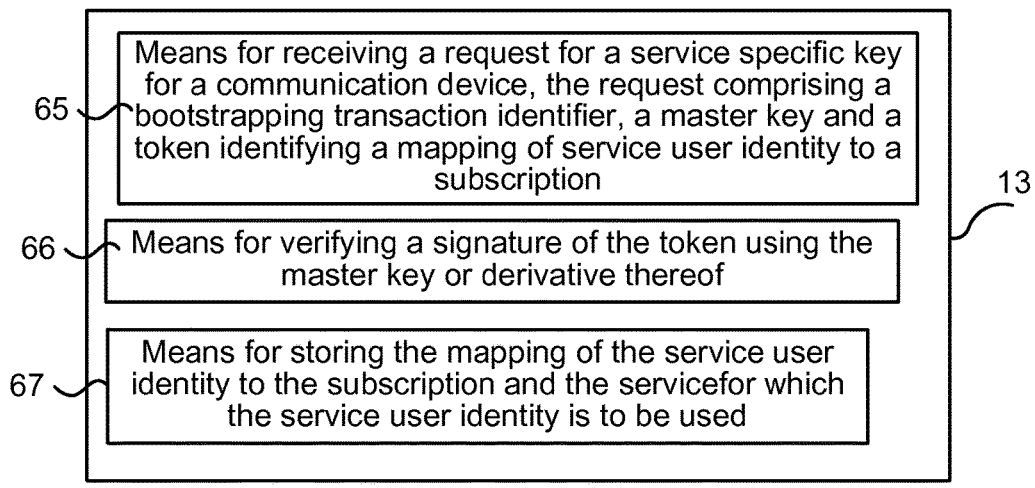
FIG. 11 illustrates a second network node comprising function modules/software modules for implementing embodiments of methods of the present disclosure.

FIG. 11 illustrates a second network node comprising function modules/software modules for implementing embodiments of methods of the present disclosure. The second network node 13 may comprise first means 65, for example a first function module, for receiving, from the first network node 16, a request for a service specific key, KsNAF, for a communication device 12. The request comprises a bootstrapping transaction identifier, B-TID, binding the communication device 12 to the subscription and a master key, Ks, comprising a shared secret between the communication device 12 and the second network node 13 of the network 10, and a token identifying a mapping of the service user identity to the subscription. Such first means 65 may for example comprise processing circuitry configured to receive the request.

The second network node 13 may comprise second means 66, for example a second function module, for verifying a signature of the token using the master key, Ks, or a derivative thereof. Such second means 66 may for example comprise processing circuitry configured to perform such verification.

The second network node 13 may comprise third means 67, for example a third function module, for storing the mapping of the service user identity to the subscription in the network 10 and the service for which the service user identity is to be used. Such third means 67 may for example comprise processing circuitry configured to perform such storing.

The mentioned first, second and third means 65, 66, 67, as well as further means (not illustrated in the figure) for implementing the various steps of the method, can be implemented using software instructions such as computer program executing in a processor and/or using hardware, such as application specific integrated circuits, field programmable gate arrays, discrete logical components etc.

The second network node 13 may thus for instance comprise processing circuitry, adapted to do perform the various method steps using program code stored in memory. The means may comprise various processing circuitry, e.g. processing circuitry, adapted to perform the various functions, e.g. receiving, verifying, storing, by using program code stored in memory, and/or processing circuitry for storing and/or processing circuitry for receiving.

Figure 12:
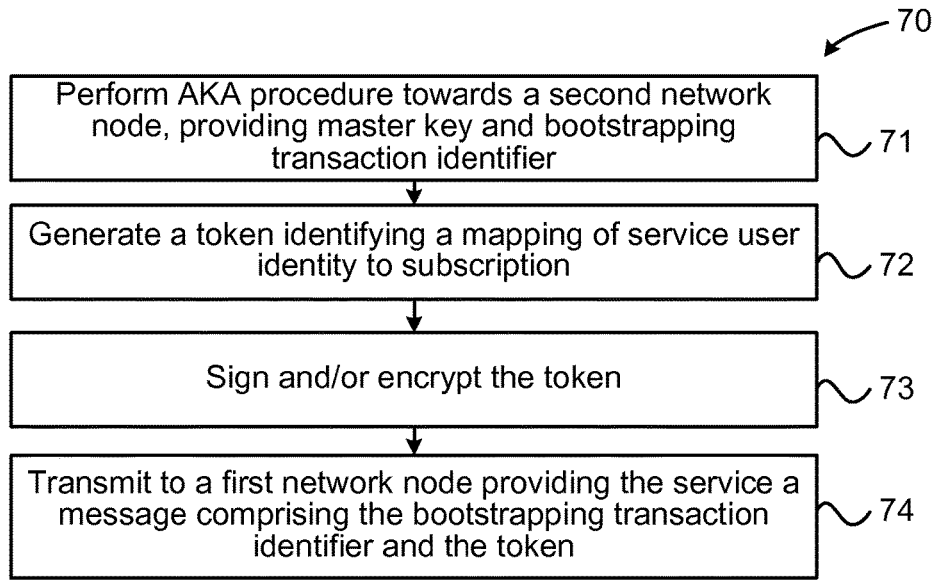
FIG. 12 illustrates a flow chart over steps of a method in a communication device in accordance with the present disclosure.

FIG. 12 illustrates a flow chart over steps of a method in a communication device in accordance with the present disclosure. The various features and functions that have been described may be combined in different ways, examples of which are given in the following. The method 70 is performed in a communication device 12 for mapping a subscription in a network 10 to a service user identity, wherein the communication device 12 accesses the network 10 using the subscription, and wherein the service user identity is used for accessing a service. The method 70 comprises performing 71 an authentication and key agreement procedure towards a second network node 13 of the network 10, providing the communication device 12 with a master key, Ks, and a bootstrapping transaction identifier, B-TID, that binds the communication device 12 to the master key, Ks.

The authentication and key agreement (AKA) procedure used may comprise a known AKA procedure, for instance involving transmitting, to the first network node 13, an identifier the communication device 12, such as the International mobile Subscriber Identity, IMSI, receiving, from the first network node 13, a message comprising a challenge, deriving, based on the challenge, a response value, RES, and generating a master key, Ks, transmitting, to the first network node 13, the response value, RES, and receiving, from the first network node 13, a bootstrapping transaction identifier, B-TID.

The method 70 comprises generating 72 a token identifying a mapping of the service user identity to the subscription.

The method 70 comprises signing and/or encrypting 73 the token by using the master key, Ks, or a derivative thereof.

The method 70 comprises transmitting 74, to a first network node 16 providing the service, a message comprising the bootstrapping transaction identifier, B-TID, and the token.

In an embodiment, the method 70 comprises, prior to transmitting 74, encrypting the signed token.

In an embodiment, the method 70 comprises, prior to the signing 73, encrypting the token.

In an embodiment, the subscription is identified by subscription specific data available within or obtainable by the communication device 12, such as the International mobile Subscriber Identity, IMSI.

Figure 13:
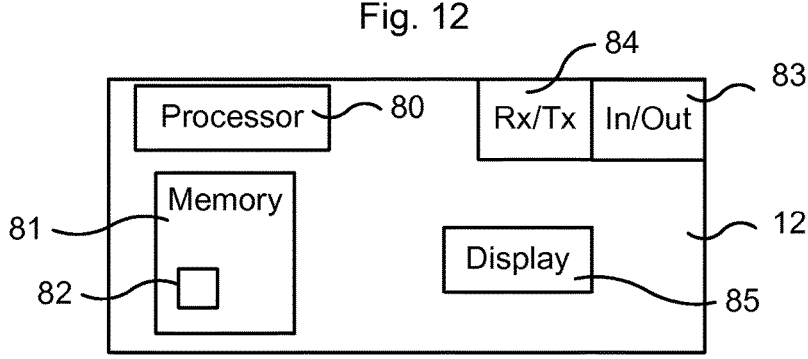
FIG. 13 illustrates schematically a communication device and means for implementing embodiments of methods of the present disclosure.

FIG. 13 illustrates schematically a communication device and means for implementing embodiments of methods of the present disclosure. The communication device 12 may comprise a processor 80 comprising any combination of one or more of a central processing unit (CPU), multiprocessor, microcontroller, digital signal processor (DSP), application specific integrated circuit etc. capable of executing software instructions stored in a memory 81, which can thus be a computer program product 81. The processor 80 can be configured to execute any of the various embodiments of the method as has been described, for instance in relation to FIG. 12.

The communication device 12 may comprise one or more input and output devices 83, denoted In/Out in the FIG. 13, constituting an interface for communication exchange with e.g. nodes of the network 10, and/or receiving and transmitting circuitry 84, denoted Rx/Tx in FIG. 13 and one or more antennas for enabling wireless communication.

The communication device 12 may comprise still further devices and components, such as for instance a display 85 and user input means (not illustrated).

A communication device 12 is provided for mapping a subscription in a network 10 to a service user identity, wherein the communication device 12 accesses the network 10 using the subscription, and wherein the service user identity is used for accessing a service. The communication device 12 is configured to:

perform an authentication and key agreement procedure towards a second network node 13 of the network 10, providing the communication device 12 with a master key, Ks, and a bootstrapping transaction identifier, B-TID, that binds the communication device 12 to the master key, Ks, generate a token identifying a mapping of the service user identity to the subscription, sign and/or encrypt the token by using the master key, Ks, or a derivative thereof, and transmit, to a first network node 16 providing the service, a message comprising the bootstrapping transaction identifier, B-TID, and the token.

The communication device 12 may be configured to perform the embodiments of the method e.g. by comprising the processor 80 and the memory 81 containing instructions, e.g. computer program code, executable by the processor 80. When the instructions are executed on the processor 80, the communication device 12 is caused to perform an embodiment of the method 70.

In an embodiment, the communication device 12 is configured to, prior to transmitting, encrypt the signed token.

In an embodiment, the communication device 12 is configured to, prior to the signing, encrypt the token.

In an embodiment, the subscription is identified by subscription specific data available within or obtainable by the communication device 12, such as the International mobile Subscriber Identity, IMSI.

Still with reference to FIG. 13, the memory 81 may be a random access memory (RAM), read only memory (ROM), Flash memory, magnetic tape, Compact Disc (CD)-ROM, digital versatile disc (DVD), Blueray disc etc. The memory 81 may also comprise persistent storage, which may, for example, be any single one or combination of magnetic memory, optical memory, solid state memory or even remotely mounted memory.

A data memory (not illustrated in FIG. 13) may also be provided for reading and/or storing data during execution of software instructions in the processor 80. Such data memory may for instance comprise random access memory (RAM) and/or read only memory (ROM).

The present disclosure also encompasses a computer program product 81 comprising a computer program 82 for implementing the methods as described above, e.g. in relation to FIG. 12, and a computer readable means on which the computer program 82 is stored. The present disclosure thus comprise a computer program 82 comprising computer program code, which, when executed on at least one processor 80 of the communication device 12 causes the communication device 12 to perform the method 70 according to any of the embodiments that have been described.

The computer program product, or the memory, thus comprises instructions executable by the processor 40. Such instructions may be comprised in a computer program, or in one or more software modules and/or function modules.

Figure 14:
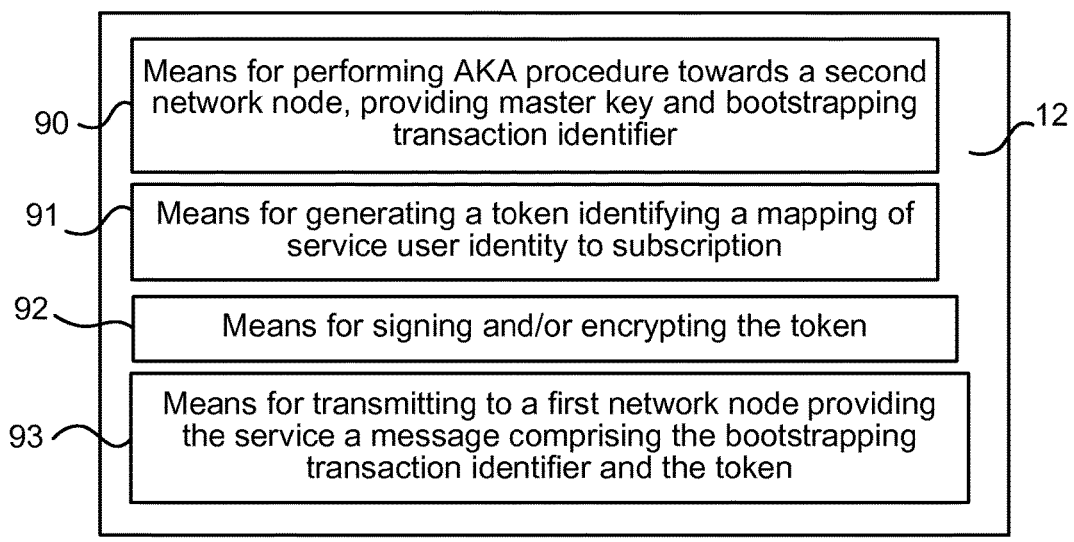
FIG. 14 illustrates a communication device comprising function modules/software modules for implementing embodiments of methods of the present disclosure.

FIG. 14 illustrates a communication device 12 comprising function modules/software modules for implementing embodiments of methods of the present disclosure. The communication device 12 may comprise first means 90, for example a first function module, for performing an authentication and key agreement procedure towards a second network node 13 of the network 10, providing the communication device 12 with a master key, Ks, and a bootstrapping transaction identifier, B-TID, that binds the communication device 12 to the master key, Ks. Such first means 90 may for example comprise processing circuitry configured to perform the authentication and key agreement procedure.

The communication device 12 may comprise second means 91, for example a second function module, for generating a token identifying a mapping of the service user identity to the subscription. Such second means 91 may for example comprise processing circuitry configured to generate the token.

The communication device 12 may comprise third means 92, for example a third function module, for signing and/or encrypting the token by using the master key, Ks, or a derivative thereof. Such third means 92 may for example comprise processing circuitry configured to generate the token.

The communication device 12 may comprise fourth means 93, for example a fourth function module, for transmitting, to a first network node 16 providing the service, a message comprising the bootstrapping transaction identifier, B-TID, and the token. Such third means 93 may for example comprise transmitting circuitry configured to transmit such message via an antenna or a wired connection.

The mentioned first, second, third and fourth means 90, 91, 92, 93, as well as further means (not illustrated in the figure) for implementing the various steps of the method, can be implemented using software instructions such as computer program executing in a processor and/or using hardware, such as application specific integrated circuits, field programmable gate arrays, discrete logical components etc.

The communication device 12 may thus for instance comprise processing circuitry, adapted to do perform the various method steps using program code stored in memory. The means may comprise various processing circuitry, e.g. processing circuitry, adapted to perform the various functions, e.g. receiving, verifying, storing, by using program code stored in memory, and/or processing circuitry for storing and/or processing circuitry for receiving.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in a first network node for mapping a subscription in a network to a service user identity, wherein a communication device accesses the network using the subscription, and wherein the service user identity is used for accessing a service provided by the first network node, the method comprising:

receiving, from the communication device a request for a service, the request comprising an authenticated service user identity;

providing, in response to the request, the communication device access to the service;

receiving, from the communication device, a message comprising a token identifying a mapping of the service user identity to the subscription; and verifying that the service user identity obtained from the token corresponds to the service user identity used when providing access to the communication device.

2. The method as claimed in claim 1, comprising, after the providing access and prior to the receiving a message, providing the communication device a trigger for activating a bootstrapping procedure for mapping of the subscription to the service user identity.

3. The method as claimed in claim 1, comprising transmitting, to the communication device, a message confirming that an account accessed using the service user identity is accessible using a generic bootstrapping architecture, GBA, procedure.

4. The method as claimed in claim 1, wherein the token is encrypted.

5. The method as claimed in claim 1, comprising:

sending, in response to a successful verification of the service user identity from the token, a message comprising the token to a second network node, the message further comprising an identifier of the communication device or the subscription in the second network node; and receiving, from the second network node, an indication that a mapping of the subscription to the service user identity was successful.

6. The method as claimed in claim 5, wherein the token is signed by the communication device and wherein the message comprising the token further comprises a bootstrapping transaction identifier, B-TID, binding the communication device to a master key, Ks, comprising a shared secret between the communication device and the second network node of the network.

7. The method as claimed in claim 6, comprising, prior to the sending the message comprising the token to a second network node:

transmitting, to the second network node, a message requesting a service specific key, KsNAF, for the communication device, the message comprising the bootstrapping transaction identifier, B-TID, and the token; and receiving, from the second network node, a response message comprising the requested service specific key, KsNAF, and an indication that a mapping of the subscription to the service user identity was successful.

8. The method as claimed in claim 7, wherein the indication that the mapping was successful comprises the response message comprising the service user identity.

9. The method as claimed in claim 7, wherein the response message further comprises information related to the subscription, and the method comprises storing the received information as account information.

10. The method as claimed in claim 9, wherein the information related to the subscription comprises a mobile subscriber integrated services digital network number, MSISDN.

11. A first network node for mapping a subscription in a network to a service user identity, wherein a communication device accesses the network using the subscription, and wherein the service user identity is used for accessing a service provided by the first network node, the first network node comprising:

a communication interface; and processing circuitry operatively associated with the communication interface and configured to:

receive, from the communication device a request for a service, the request comprising an authenticated service user identity; and provide, in response to the request, the communication device access to the service;

receive, from the communication device, a message comprising a token identifying a mapping of the service user identity to the subscription; and verify that the service user identity obtained from the token corresponds to the service user identity used when providing access to the communication device.

12. The first network node as claimed in claim 11, wherein the first network node is configured to, after the providing access and prior to the receiving a message, provide the communication device a trigger for activating a bootstrapping procedure for mapping of the subscription to the service user identity.

13. The first network node as claimed in claim 11, wherein the first network node is configured to transmit, to the communication device, a message confirming that an account accessed using the service user identity is accessible using a generic bootstrapping architecture, GBA, procedure.

14. The first network node as claimed in claim 11, wherein the token is encrypted.

15. The first network node as claimed in claim 11, wherein the first network node is configured to:

send, in response to a successful verification of the service user identity from the token, a message comprising the token to a second network node, the message further comprising an identifier of the communication device or the subscription in the second network node; and receive, from the second network node, an indication that a mapping of the subscription to the service user identity was successful.

16. The first network node as claimed in claim 15, wherein the token is signed by the communication device and wherein the message comprising the token further comprises a bootstrapping transaction identifier, B-TID, binding the communication device to a master key, Ks, comprising a shared secret between the communication device and a second network node of the network.

17. The first network node as claimed in claim 16, wherein the first network node is configured to, prior to sending the message comprising the token to the second network node:

transmit, to the second network node, a message requesting a service specific key, KsNAF, for the communication device, the message comprising the bootstrapping transaction identifier, B-TID, and the token; and receive, from the second network node, a response message comprising the requested service specific key, KsNAF, and an indication that a mapping of the subscription to the service user identity was successful.

18. The first network node as claimed in claim 17, wherein the indication that the mapping was successful comprises the response message comprising the service user identity.

19. The first network node as claimed in claim 17, wherein the response message further comprises information related to the subscription, and the first network node is configured to store the received information as account information.

20. The first network node as claimed in claim 19, wherein the information related to the subscription comprises a mobile subscriber integrated services digital network number, MSISDN.

21. A non-transitory computer-readable medium storing a computer program comprising instructions that, when executed on processing circuitry of a first network node, configure the network node for mapping a subscription in a network to a service user identity, wherein a communication device accesses the network using the subscription, and wherein the service user identity is used for accessing a service provided by the first network node, the computer program comprising program instructions configuring the first network node to:

receive, from the communication device a request for a service, the request comprising an authenticated service user identity;

provide, in response to the request, the communication device access to the service;

receive, from the communication device, a message comprising a token identifying a mapping of the service user identity to the subscription; and verify that the service user identity obtained from the token corresponds to the service user identity used when providing access to the communication device.

22. A method performed in a second network node for mapping a subscription in a network to a service user identity, wherein a communication device accesses the network using the subscription, and wherein the service user identity is used for accessing the service provided by a first network node, the method comprising:
- receiving, from the first network node, a request for a service specific key, KsNAF, for a communication device, the request comprising a bootstrapping transaction identifier, B-TID, binding the communication device to the subscription and a master key, Ks, comprising a shared secret between the communication device and the second network node of the network, and a token identifying a mapping of the service user identity to the subscription;
- verifying a signature of the token using the master key, Ks, or a derivative thereof; and
- storing the mapping of the service user identity to the subscription in the network and the service for which the service user identity is to be used.

23. The method as claimed in claim 22, comprising generating a service specific key, KsNAF, using the master key, Ks, and transmitting, to the first network node, a response comprising the service specific key, KsNAF, and an indication that a mapping of the subscription to the service user identity was successful.

24. The method as claimed in claim 23, wherein the transmitting further comprises transmitting user security settings comprising the mapped service user identity.

25. A second network node for mapping a subscription in a network to a service user identity, wherein a communication device accesses the network using the subscription, and wherein the service user identity is used for accessing the service provided by a first network node, the second network node comprising:
- a communication interface; and
- processing circuitry operatively associated with the communication interface and configured to:
  - receive, from the first network node, a request for a service specific key, KsNAF, for a communication device, the request comprising a bootstrapping transaction identifier, B-TID, binding the communication device to the subscription and a master key, Ks, comprising a shared secret between the communication device and the second network node of the network, and a token identifying a mapping of the service user identity to the subscription;
  - verify a signature of the token using the master key, Ks, or a derivative thereof; and
  - store the mapping of the service user identity to the subscription in the network and the service for which the service user identity is to be used.

26. The second network node as claimed in claim 25, configured to generate a service specific key, KsNAF, using the master key, Ks, and transmit, to the first network node, a response comprising the service specific key, KsNAF, and an indication that a mapping of the subscription to the service user identity was successful.

27. The second network node as claimed in claim 26, configured to further transmit user security settings comprising the mapped service user identity.

28. A non-transitory computer-readable medium storing a computer program comprising program instructions that, when executed by processing circuitry of a second network node, configure the second network node for mapping a subscription in a network to a service user identity, wherein a communication device accesses the network using the subscription, and wherein the service user identity is used for accessing the service provided by a first network node, the computer program comprising program instructions configuring the second network node to:
- receive, from the first network node, a request for a service specific key, KsNAF, for a communication device, the request comprising, a bootstrapping transaction identifier, B-TID, binding the communication device to the subscription and a master key, Ks, comprising a shared secret between the communication device and the second network node of the network, and a token identifying a mapping of the service user identity to the subscription;
- verify a signature of the token using the master key, Ks, or a derivative thereof; and
- store the mapping of the service user identity to the subscription in the network and the service for which the service user identity is to be used.

29. A method performed in a communication device for mapping a subscription in a network to a service user identity, wherein the communication device accesses the network using the subscription, and wherein the service user identity is used for accessing a service, the method comprising:
- performing an authentication and key agreement procedure towards a second network node of the network, providing the communication device with a master key, Ks, and a bootstrapping transaction identifier, B-TID, that binds the communication device to the master key, Ks;
- generating a token identifying a mapping of the service user identity to the subscription;
- signing and/or encrypting the token by using the master key, Ks, or a derivative thereof; and
- transmitting, to a first network node providing the service, a message comprising the bootstrapping transaction identifier, B-TID, and the token.

30. The method as claimed in claim 29, comprising, prior to transmitting, encrypting the signed token.

31. The method as claimed in claim 29, comprising, prior to the signing, encrypting the token.

32. The method as claimed in claim 29, wherein the subscription is identified by subscription specific data available within or obtainable by the communication device, such as the International mobile Subscriber Identity, IMSI.

33. A communication device for mapping a subscription in a network to a service user identity, wherein the communication device accesses the network using the subscription, and wherein the service user identity is used for accessing a service, the communication device comprising:
- a communication interface; and
- processing circuitry operatively associated with the communication interface and configured to:
  - perform an authentication and key agreement procedure towards a second network node of the network, providing the communication device with a master key, Ks, and a bootstrapping transaction identifier, B-TID, that binds the communication device to the master key, Ks;
  - generate a token identifying a mapping of the service user identity to the subscription;
  - sign and/or encrypt the token by using the master key, Ks, or a derivative thereof; and
  - transmit, to a first network node providing the service, a message comprising the bootstrapping transaction identifier, B-TID, and the token.

34. The communication device as claimed in claim 33, configured to, prior to transmitting, encrypt the signed token.

35. The communication device as claimed in claim 33, configured to, prior to the signing, encrypt the token.

36. The communication device as claimed in claim 33, wherein the subscription is identified by subscription specific data available within or obtainable by the communication device, such as the International mobile Subscriber Identity, IMSI.

37. A non-transitory computer-readable medium storing a computer program comprising program instructions that, when executed on processing circuitry of a communication device, configure the communication device for mapping a subscription in a network to a service user identity, wherein the communication device accesses the network using the subscription, and wherein the service user identity is used for accessing a service, the computer program comprising program instructions configuring the communication device to:

perform an authentication and key agreement procedure towards a second network node of the network, providing the communication device with a master key, Ks, and a bootstrapping transaction identifier, B-TID, that binds the communication device to the master key, Ks;

generate a token identifying a mapping of the service user identity to the subscription;

sign and/or encrypt the token by using the master key, Ks, or a derivative thereof; and transmit, to a first network node providing the service, a message comprising the bootstrapping transaction identifier, B-TID, and the token.

\* \* \* \* \*